(12) United States Patent
Liu et al.

(10) Patent No.: US 9,075,731 B2
(45) Date of Patent: Jul. 7, 2015

(54) USING TRANSACTION ENTRIES TO ACHIEVE CRASH CONSISTENCY WHEN PERFORMING WRITE-BEHIND CACHING USING A FLASH STORAGE-BASED CACHE

(71) Applicant: VMware, Inc., Palo Alto, CA (US)

(72) Inventors: Deng Liu, Mountain View, CA (US); Thomas A. Phelan, San Francisco, CA (US); Ramkumar Vadivelu, San Jose, CA (US); Wei Zhang, San Jose, CA (US); Sandeep Uttamchandani, Cupertino, CA (US); Li Zhou, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 274 days.

(21) Appl. No.: 13/748,308

(22) Filed: Jan. 23, 2013

(65) Prior Publication Data

US 2014/0208001 A1    Jul. 24, 2014

(51) Int. Cl.
*G06F 13/00* (2006.01)
*G06F 12/08* (2006.01)
*G06F 3/06* (2006.01)
*G06F 11/14* (2006.01)

(52) U.S. Cl.
CPC .......... *G06F 12/0891* (2013.01); *G06F 3/0685* (2013.01); *G06F 11/1471* (2013.01); *G06F 12/0815* (2013.01); *G06F 12/0868* (2013.01)

(58) Field of Classification Search
CPC .............. G06F 3/0685; G06F 12/0868; G06F 11/1471; G06F 12/0815
USPC .................. 711/135, 141, 143, 144, 133, 103
See application file for complete search history.

(56) References Cited

U.S. PATENT DOCUMENTS

| | | | |
|---|---|---|---|
| 2004/0162950 A1* | 8/2004 | Coulson | 711/141 |
| 2006/0218362 A1* | 9/2006 | McManis | 711/162 |
| 2006/0248131 A1* | 11/2006 | Marwinski et al. | 707/206 |
| 2008/0229025 A1* | 9/2008 | Plamondon | 711/126 |
| 2011/0265083 A1* | 10/2011 | Davis | 718/1 |
| 2013/0166820 A1* | 6/2013 | Batwara et al. | 711/103 |
| 2014/0059371 A1* | 2/2014 | Kitchin et al. | 713/323 |

* cited by examiner

*Primary Examiner* — Hong Kim

(57) ABSTRACT

Techniques for achieving crash consistency when performing write-behind caching using a flash storage-based cache are provided. In one embodiment, a computer system receives from a virtual machine a write request that includes data to be written to a virtual disk and caches the data in a flash storage-based cache. The computer system further logs a transaction entry for the write request in the flash storage-based cache, where the transaction entry includes information usable for flushing the data from the flash storage-based cache to a storage device storing the virtual disk. The computer system then communicates an acknowledgment to the VM indicating that the write request has been successfully processed.

19 Claims, 8 Drawing Sheets

USING TRANSACTION ENTRIES TO ACHIEVE CRASH CONSISTENCY WHEN PERFORMING WRITE-BEHIND CACHING USING A FLASH STORAGE-BASED CACHE

BACKGROUND

Server Flash Cache (SFC) is a technology that allows server systems to use flash storage as a cache to accelerate virtual machine (VM) I/O operations. Several SFC implementations support a feature known as write-behind caching. When a server system enables SFC write-behind caching, the server system intercepts VM write requests directed to virtual disks stored in a backend storage device (e.g., a hard disk-based array), caches the data associated with the write requests in a flash storage-based cache (i.e., "flash cache"), and immediately returns acknowledgements to the originating VMs indicating successful write completion. Upon receiving the acknowledgements, the VMs continue their processing. At a later point in time, the server system flushes the data from the flash cache to the backend storage device, thereby completing the actual write process. Since the VMs can proceed with their processing as soon as the server system caches the data in flash storage (rather than waiting for the server system to write the data to slower hard disk-based storage), this feature can significantly improve VM write performance.

To carry out write-behind caching in an efficient manner, the server system generally maintains, in volatile memory (e.g., RAM), cache metadata that keeps track of which pages in the flash cache are "dirty" (i.e., include unflushed write updates) and how those dirty pages map to target locations on disk. When the server system is ready to flush the flash cache to the backend storage device, the server system accesses the in-memory cache metadata to determine what data needs to be flushed and where the data should be written.

One issue with maintaining cache metadata in volatile memory as noted above is that the cache metadata is non-persistent across system crashes and other events that cause a system shutdown or power cycle. The unexpected loss of this cache metadata due to such an event can potentially leave the server system and backend storage device in an inconsistent state. For example, consider a scenario where the server system crashes after it has cached and acknowledged a VM write request, but before it has flushed the data associated with the write request from the flash cache to the backend storage device. Upon recovering from the crash, the server system no longer has access to the cache metadata, and thus cannot flush the data from the flash cache. As a result, the data is effectively "lost," since the server system is unable to propagate it to persistent storage. At the same time, the VM that originated the write request assumes (due to the acknowledgement it received prior to the crash) that the data is stored in the virtual disk resident on the backend storage device, when in fact it is not. This inconsistency can lead to unpredictable errors and other difficult-to-resolve issues.

SUMMARY

Techniques for achieving crash consistency when performing write-behind caching using a flash storage-based cache are provided. In one embodiment, a computer system receives from a VM a write request that includes data to be written to a virtual disk and caches the data in a flash storage-based cache. The computer system further logs a transaction entry for the write request in the flash storage-based cache, where the transaction entry includes information usable for flushing the data from the flash storage-based cache to a storage device storing the virtual disk. The computer system then communicates an acknowledgment to the VM indicating that the write request has been successfully processed.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments provide techniques for achieving crash consistency when performing write-behind caching using a flash storage-based cache ("flash cache"). In one embodiment, a server system can log, for each VM write request that it caches in a flash cache, a corresponding transaction entry in the flash cache. The transaction entry can include information usable for flushing the data associated with the write request from the flash cache to a backend storage device (e.g., a hard disk-based array). In a particular embodiment, the server system can log the transaction entry after caching the data in the flash cache, but before (or concurrently with) acknowledging successful processing/completion of the write request to the originating VM. Upon experiencing a system crash (or other event that causes the server system to lose its in-memory cache metadata), the server system can "replay" the transaction entries logged in the flash cache and thereby flush the cached data to the backend storage device. In this manner, the server system can ensure that that it remains in a consistent state after the crash. In certain embodiments, this approach can guarantee that acknowledged write requests are always propagated to backend storage, and thus are never lost.

Figure 1:
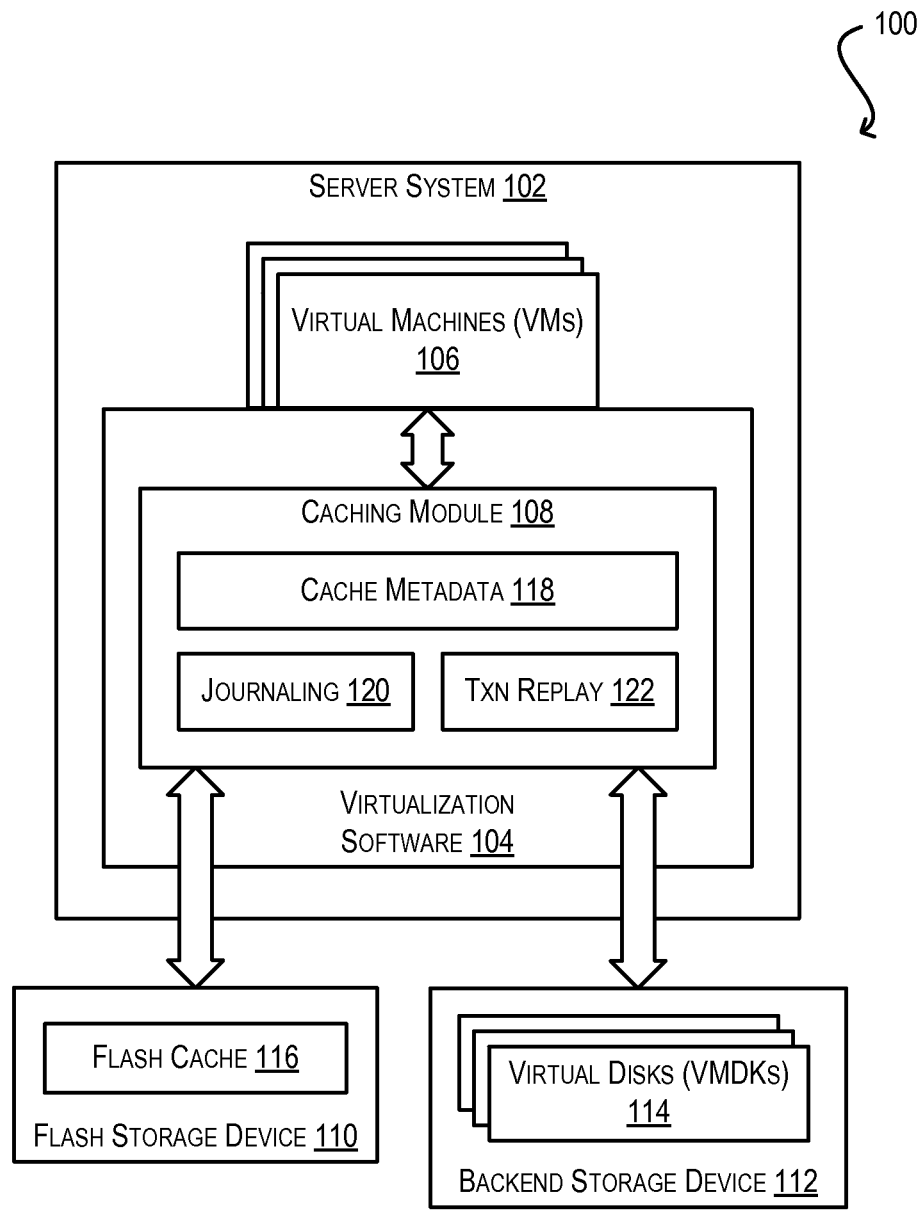
FIG. 1 depicts a block diagram of a system environment that supports crash consistency when performing SFC write-behind caching according to one embodiment.

FIG. 1 depicts a system environment 100 that supports crash consistency when performing SFC write-behind caching according to one embodiment. As shown, system environment 100 includes a server system 102 that executes virtualization software 104. Virtualization software 104 (also known as a "hypervisor") is a software layer that provides an environment in which one or more VMs 106 can run. In one embodiment, virtualization software 104 can interact directly with the hardware platform of server system 102 without an intervening host operating system. In this embodiment, virtualization software 104 can include a kernel (not shown) that manages VM use of the various hardware devices of server system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

Virtualization software 104 includes a caching module 108 that interacts with a flash storage device 110 (e.g., a solid state disk (SSD), a PCIe-based flash card, a specialized flash appliance, etc.) and a backend storage device 112 (e.g., a hard disk-based array). Backend storage device 112 stores a number of virtual disks 114 (generically referred to as "VMDKs") that VMs 106 access to read and write persistent data. In various embodiments, caching module 108 can leverage flash storage device 110 to perform write-behind caching. For instance, caching module 108 can intercept write requests that VMs 106 direct to VMDKs 114 and store the data associated with the write requests in a flash cache 116 of flash storage device 110. Upon storing the data in flash cache 116, caching module 108 can transmit acknowledgements to VMs 106 indicating that the write requests have been successfully processed (although caching module 108 has not yet written the data to backend storage device 112). At a later point in time, caching module 108 can propagate, or flush, the cached data from flash cache 116 to backend storage device 112, thereby synchronizing the write updates to VMDKs 114.

To facilitate this process, caching module 108 can maintain, in volatile memory (e.g., RAM), book-keeping information regarding the data cached in flash cache 116 (depicted as cache metadata 118). Cache metadata 118 can include, e.g., a list of dirty pages in flash cache 116 and mappings between those dirty pages and target locations in backend storage device 112. As noted in the Background section, one drawback with maintaining cache metadata 118 solely in volatile memory is that this information will be lost if server system 102 crashes or experiences any other event that causes an unexpected system shutdown/power cycle. This can result in scenarios where caching module 108 is unable to propagate write requests from flash cache 116 to backend storage device 112 that caching module 108 has already acknowledged as being complete to VMs 106.

To address this issue, caching module 108 can include a journaling component 120 and a transaction ("txn") replay component 122. As described in further detail below, journaling component 120 and transaction replay component 122 can act in concert to ensure that server system 102 is "crash consistent" when performing write-behind caching via flash cache 116, such that all acknowledged VM write requests cached in flash cache 116 are ultimately propagated to backend storage device 112 (regardless of system crashes or other similar events).

Figure 2:
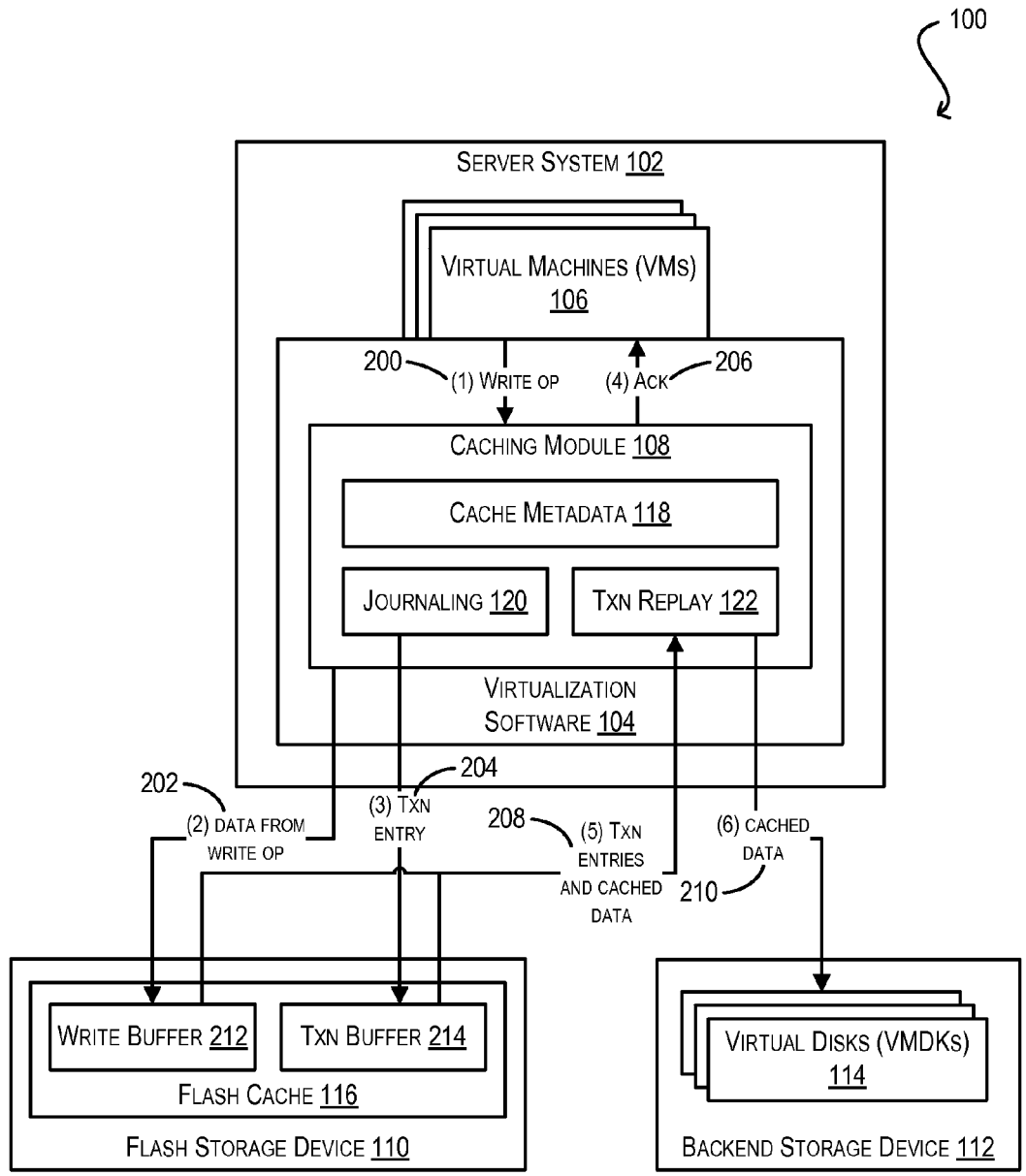
FIG. 2 depicts a flow within the block diagram of FIG. 1 for achieving crash consistency when performing SFC write-behind caching according to one embodiment.

FIG. 2 depicts a data flow within system environment 100 that explains, at a high level, the processing performed by journaling component 120 and transaction replay component 122 according to an embodiment. At step (1) of the flow (reference numeral 200), caching module 108 can receive a write request from a VM 106 that includes data to be written to a target VMDK 114. At step (2) (reference numeral 202), caching module 108 can cache the data in a portion of flash cache 116 depicted as write buffer area 212.

At step (3) (reference numeral 204), journaling component 120 can generate a transaction entry for the write request and log the transaction entry in a portion of flash cache 116 depicted as transaction buffer area 214. The transaction entry can include information usable for flushing the data associated with the write request from flash cache 116 to backend storage device 112. For example, the transaction entry can include a transaction identifier, an offset indicating where the data is cached in write buffer area 212, an identifier of target VMDK 114, and an offset indicating the intended location for the data in target VMDK 114. Immediately after (or simultaneously with) the logging of the transaction entry, caching module 108 can communicate an acknowledgment to VM 106 indicating successful processing/completion of the write request (step (4), reference numeral 206).

At some later point in time (e.g., after a system crash), transaction replay component 122 can retrieve the transaction entries and cached write updates from transaction buffer area 214 and write buffer area 212 respectively (step (5), reference numeral 208). Transaction replay component 122 can then sort the transaction entries by transaction identifier and "replay" the transaction entries in sorted order. This replay process flushes the data associated with the transaction entries from write buffer area 212 to virtual disks 114, thereby synchronizing flash cache 116 with backend storage device 112. In a particular embodiment, the order in which transaction replay component 122 replays transaction entries can be strictly consistent with the order in which VMs 106 issue write requests. This strict consistency ensures that the data associated with the transaction entries is correctly flushed to backend storage device 112.

Figure 3A:
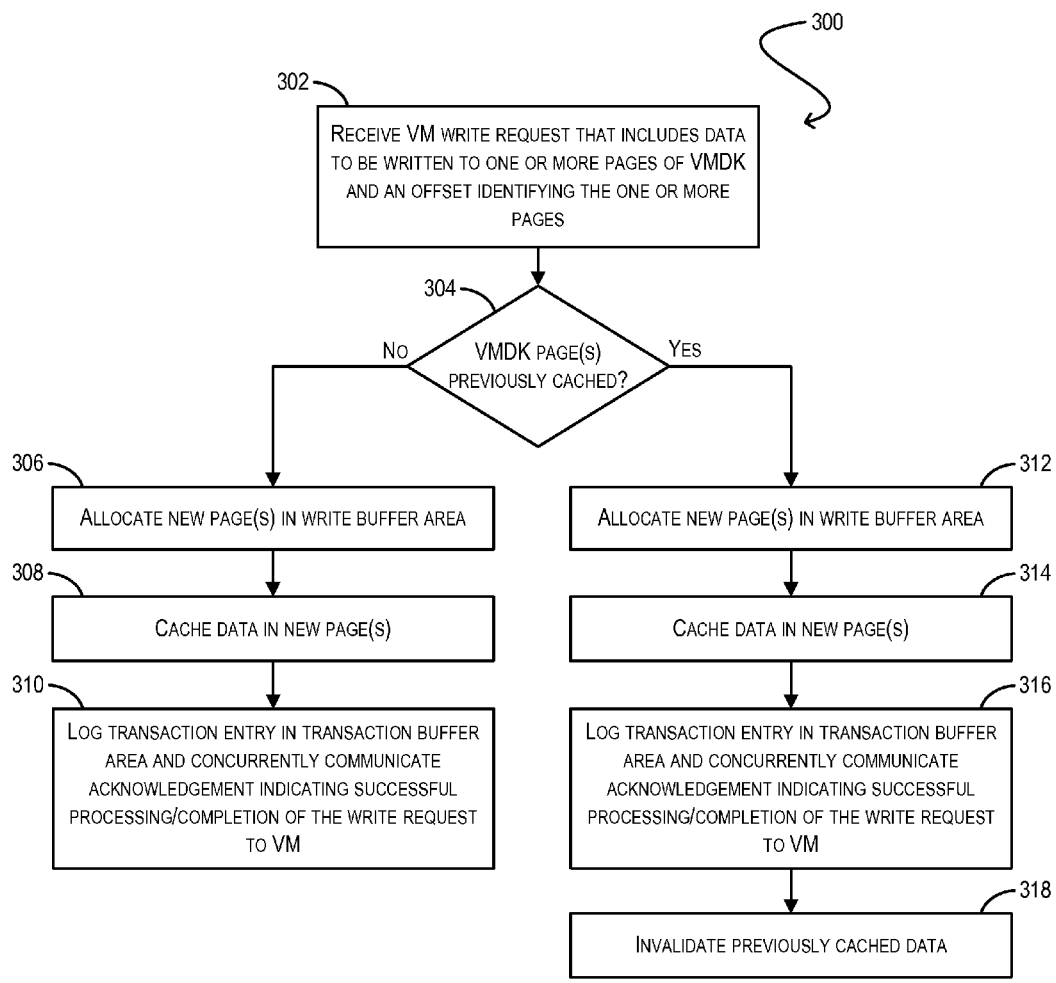
FIG. 3A depicts a flowchart for logging transaction entries according to one embodiment.

FIG. 3A depicts a process 300 that provides a more detailed description of the processing that caching module 108 and journaling component 120 perform at steps (1) through (4) of FIG. 2 according to one embodiment. At block 302, caching module 108 can receive a write request from a VM 106 that includes data to be written to one or more pages of a target VMDK 114 and an offset identifying the one or more VMDK pages. In a particular embodiment, the offset can correspond to a logical block address (LBA) of the target VMDK.

At block 304, caching module 108 can determine whether flash cache 116 already includes cached data for the VMDK pages identified at block 302. If not, caching module 108 can allocate one or more new pages in write buffer area 212 of flash cache 116 and cache the data received at block 302 in the newly allocated pages (blocks 306 and 308).

Once caching module 108 has cached the data, journaling component 120 can log a transaction entry for the write request in transaction buffer area 214 of flash cache 116. Caching module 108 can then communicate an acknowledgement indicating successful processing/completion of the write request to originating VM 106 (block 310). In certain embodiments, journaling component 120 and caching module 108 can log the transaction entry and transmit the acknowledgment to VM 106 as a single, atomic operation. For example, caching module 108 can transmit the acknowledgement in the context of a callback of an I/O operation that journaling component 120 executes to commit the transaction entry to transaction buffer area 214. This ensures that VM 106 only receives the acknowledgement if journaling component 120 has successfully committed the transaction entry to flash cache 116.

Figure 4:
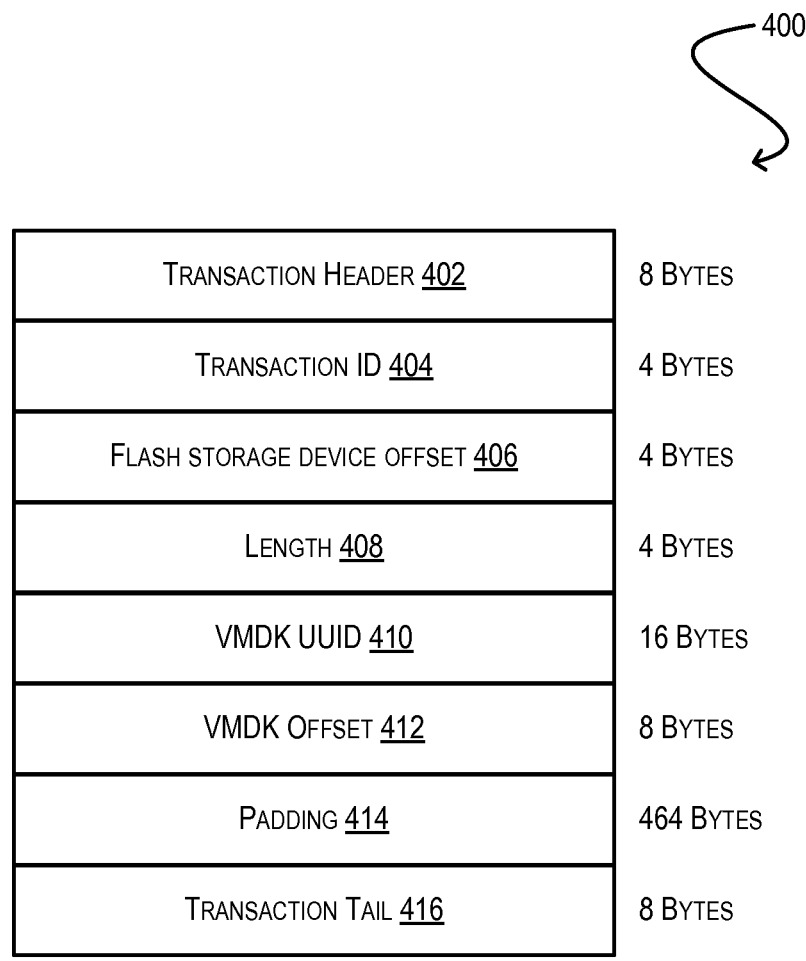
FIG. 4 depicts an exemplary transaction entry according to one embodiment.

FIG. 4 depicts the format of an exemplary transaction entry 400 according to one embodiment. As shown, transaction entry 400 includes a transaction header 402, a transaction ID

404, a flash storage device offset 406, a length 408, a VMDK UUID 410, a VMDK offset 412, a padding section 414, and a transaction tail 416. Transaction header 402 and transaction tail 416 denote the beginning and end of transaction entry 400. As noted below, transaction replay component 122 can look for these fields at the time of replaying transaction entries to ensure that each transaction entry is "complete" (i.e., was completely recorded to transaction buffer area 214). Transaction ID 404 is a sequentially increasing (or decreasing) identifier that indicates the order in which journaling component 120 created/logged the transaction entry. VMDK UUID 410 uniquely identifies the target VMDK to which the write request associated with transaction entry 400 is directed. Flash storage device offset 406 and VMDK offset 412 represent the relative locations where the data associated with the write request is cached in write buffer area 212 and where the data should be written in the target VMDK respectively. In a particular embodiment, offsets 406 and 412 are represented as LBAs. Length 408 indicates the total length of the data associated with the write request. And padding section 414 is an undefined portion of transaction entry 400 that can hold data for future enhancements to the logging functionality that journaling component 120 provides.

Returning to FIG. 3A, if caching module 108 determines that flash cache 116 already includes cached data for the VMDK pages identified at block 302, caching module 108 can allocate one or more new pages in write buffer area 212 and cache the data received at block 302 in the newly allocated pages (blocks 312 and 314). Note that with this approach, caching module 108 does not immediately overwrite the previously cached data in flash cache 116.

Once caching module 108 has cached the data, journaling component 120 can log a transaction entry for the write request in transaction buffer area 214 of flash cache 116 and caching module 108 can communicate an acknowledgement indicating successful processing/completion of the write request to originating VM 106 (block 316). Like block 310, journaling component 120/caching module 108 can perform the processing of block 316 as a single, atomic operation.

Figure 3B:
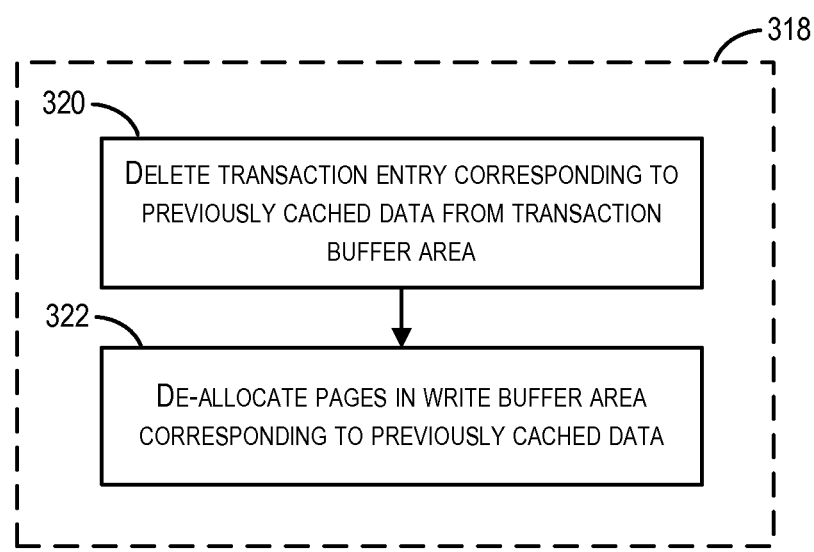
FIG. 3B depicts a flowchart for invaliding previously cached data according to one embodiment.

Finally, at block 318, caching module 108 can invalidate the previously cached data in flash cache 116. FIG. 3B depicts a series of steps that caching module 108 can perform in the context of block 318. At block 320 of FIG. 3B, caching module 108 can delete any transaction entries in transaction buffer area 214 of flash cache 116 that correspond to the previously cached data. In one embodiment, this deletion process can include issuing a TRIM command to flash storage device 110, where the TRIM command is directed to the LBA(s) corresponding to the transaction entries. At block 322, caching module 108 can de-allocate the pages in write buffer area 212 of flash cache 116 that correspond to the previously cached data. Thus, caching module 108 can effectively free these pages so that caching module 108 can use them in the future to cache new write updates.

The processing shown in FIGS. 3A and 3B can ensure that server system 102 and backend storage device 112 remain in a consistent state after a crash (or other event that causes caching module 108 to lose in-memory cache metadata 118). In particular, the processing of FIGS. 3A and 3B can ensure than that all acknowledged write requests cached in flash cache 116 are ultimately propagated to backend storage device 112 (and thus, no acknowledged write requests are lost). For example, if server system 102 crashes between block 308 and block 310 (in the case of a write to one or more previously un-cached VMDK pages) or between block 314 and block 316 (in the case of a write to one or more previously cached VMDK pages), caching module 108 cannot flush the cached data to backend storage device 112 since journaling component 120 never writes a corresponding transaction entry. However, this situation does not create any inconsistencies because the write request is never acknowledged to the originating VM.

As another example, if server system 102 crashes after block 310 or after block 316, the write request will not be lost because journaling component 112 has already logged the transaction entry for the write request in flash cache 116. Accordingly, as described with respect to FIG. 2, transaction replay component 122 will replay the transaction entry after the crash and thereby flush the data associated with the write request to backend storage device 112.

In some cases, a crash may occur between blocks 316 and 318 (i.e., after journaling component 120 has logged the transaction entry for the current write request, but before caching module 108 can invalidate the previously cached data). However, this will result in a situation where transaction replay component 122 simply replays both the transaction entry for the previously cached data and the transaction entry for the newly cached data. Since transaction replay component 122 replays transaction entries in order of transaction ID, the newly cached data will overwrite the previously cached data in target VMDK 114, and thus this will remain consistent with VM 106's understanding of the state of VMDK 114.

As described with respect to block 312 of FIG. 3A, when caching module 108 receives a write request directed to one or more VMDK pages that are already cached in flash cache 116, caching module 108 can store the data associated the write request in one or more newly allocated pages in write buffer area 212 (rather than immediately overwriting the existing pages containing the previously cached data). One benefit of this approach is that caching module 108 can avoid flushing cached data to backend storage device 112 that caching module 108 has not acknowledged to an originating VM. For instance, consider a situation where caching module 108 overwrites previously cached data with new data in write buffer area 212 at block 314, and server system 102 subsequently crashes between blocks 314 and 316. In this case, flash cache 116 contains only the new, unacknowledged write update, but also contains the transaction entry for the previously cached write update. As a result, when transaction replay component 122 replays the transaction entry, transaction replay component 122 will flush the new write update to target VMDK 114, which is incorrect since caching module 108 never acknowledged the new write to the originating VM. This problem of flushing unacknowledged writes is avoided by caching data for previously cached VMDK pages in newly allocated pages of flash cache 116 per blocks 312 and 314 of FIG. 3A.

Figure 5:
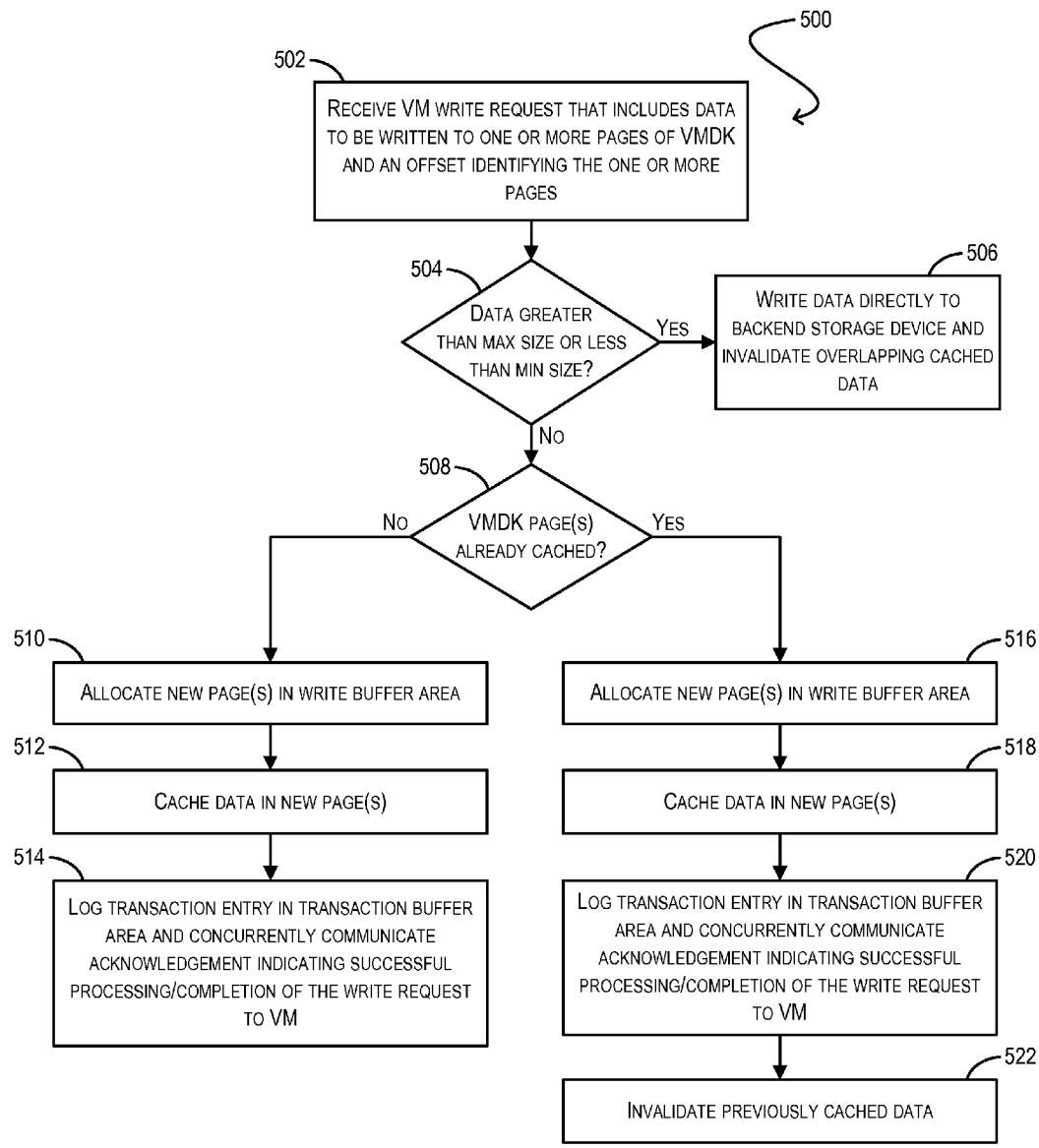
FIG. 5 depicts an alternative flowchart for logging transaction entries according to one embodiment.

In certain embodiments, caching module 108 may prefer to disable the caching of VM writes that exceed a predetermined maximum size or are smaller than a predetermined minimum size. For example, large writes (e.g., greater than 64 KB in size) tend to be sequential, and thus do not benefit much from caching via flash cache 116. Further, small writes (e.g., less than 4 KB in size) are usually trivial with respect to the total amount of I/O, while potentially requiring a large amount of overhead (e.g., metadata) to keep track of what data is cached and what data needs to be flushed. In embodiments where caching module 108 disables caching for large writes and small writes, caching module 108 can automatically invalidate data in flash cache 116 that overlaps with such writes. FIG. 5 depicts a process 500 for carrying out such a flow according to one embodiment.

At block 502, caching module 108 can receive a write request from a VM 106. At block 504, caching module 108 can determine whether the size of the data associated with the write request exceeds a maximum size (e.g., 64 KB) or is less than a minimum size (e.g., 4 KB). If so, caching module 108 can directly write the data to backend storage device 112 without caching the data in flash cache 116. Further, caching module 108 can invalidate any previously cached data in flash cache 116 that overlaps with the VMDK pages to which the write request is directed. In a particular embodiment, caching module 108 can carry out this invalidation process in a manner substantially similar to the steps shown in FIG. 3B.

If the data associated with the write request is less than the maximum size and greater than the minimum size, process 500 can proceed to cache the data in flash cache 116 per blocks 508-522, which are substantially similar to blocks 304-318 of FIG. 3A.

Figure 6:
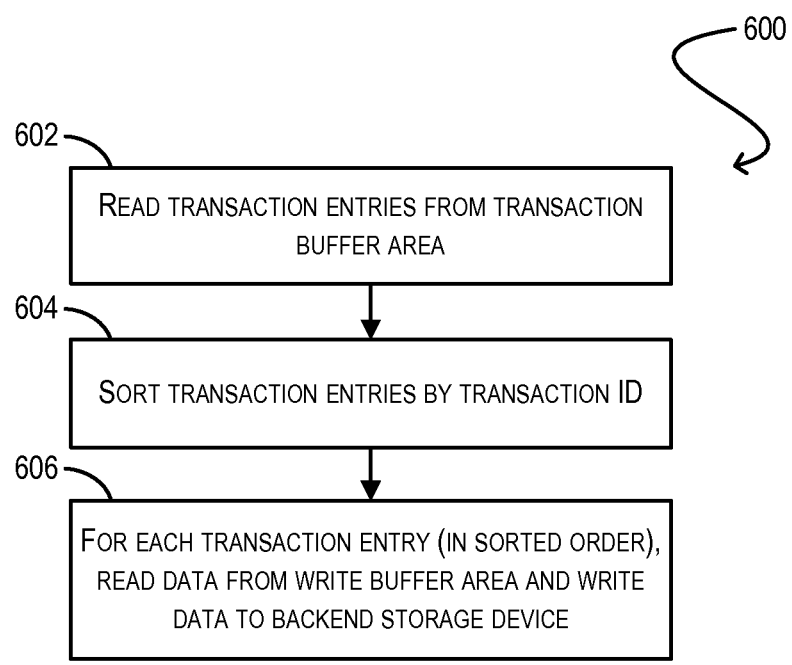
FIG. 6 depicts a flowchart for replaying transaction entries according to one embodiment.

FIG. 6 depicts a process 600 that provides a more detailed description of the replay procedure that transaction replay component 122 executes at steps (5) and (6) of FIG. 2. In one embodiment, transaction replay component 122 can initiate process 600 at boot-up of server system 102 after, e.g., a system crash. In another embodiment, transaction replay component 122 can initiate process 600 prior to a planned shutdown of server system 102. In yet another embodiment, transaction replay component 122 can initiate process 600 when transaction buffer area 214 of flash cache 116 has reached a predetermined threshold size, and thus should be cleared to accommodate transaction entries for new write requests.

At block 602, transaction replay component 122 can read the transaction entries that journaling component 120 has logged in transaction buffer area 214. As part of block 602, transaction replay component 122 can discard any transaction entries that are missing either the transaction header or the transaction tail (as shown in FIG. 4).

At block 604, transaction replay component 122 can sort the transaction entries according to transaction ID. Transaction replay component 112 can then read the data associated with each transaction entry (in sorted order) that is cached in write buffer area 212 and write the data to backend storage device 112 (block 606). In a particular embodiment, transaction replay component can perform the processing of block 606 in a batch fashion to maximize the throughput of writing the cached data to backend storage device 112.

Finally, at block 608, transaction replay component 122 can delete the transaction entries processed at blocks 602-606 to free space in transaction buffer area 214.

Figure 7:
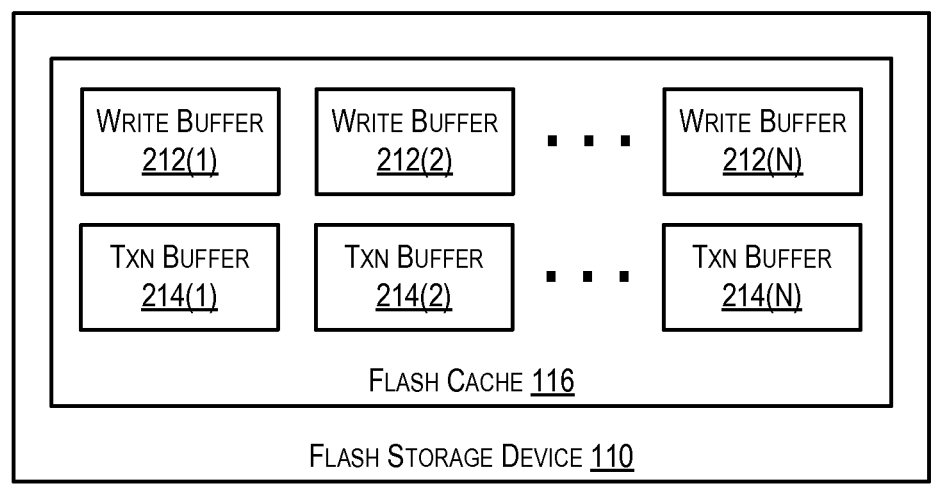
FIG. 7 depicts a representation of a flash storage-based cache that includes multiple write buffer areas and multiple transaction buffer areas according to one embodiment.

Although FIG. 2 depicts flash cache 116 as including a single write buffer area 212 and a single transaction buffer area 214, in certain embodiments flash cache 116 can include multiple write buffer areas and multiple transaction buffer areas. An example of such a configuration is shown in FIG. 7. In the embodiment of FIG. 7, each transaction buffer area 214(1)-214(N) can store transaction entries for a corresponding write buffer area 212(1)-212(N). In a particular embodiment, each transaction buffer area 214(1)-214(N) can occupy approximately 4 MB of space in flash cache 116, while each write buffer area 212(1)-212(N) can occupy approximately 32 MB to 256 MB of space in flash cache 116. In alternative embodiments, other size allocations for transaction buffer areas 214(1)-214(N) and write buffer areas 212(1)-212(N) are possible.

One advantage of implementing multiple transaction and write buffer areas as shown in FIG. 7 is that transaction replay component 122 can replay transaction entries from one transaction buffer area/write buffer area while caching module 108/journaling component 120 continues to cache write updates and log transaction entries for incoming write requests in a different transaction buffer area/write buffer area. With this parallelized approach, the transaction replay process will not block caching module 108 from processing new write requests, and thus the overall performance of server system 102 is improved.

As a further performance enhancement, caching module 108 can sample I/O statistics pertaining to backend storage device 112 during runtime of server system 102. The I/O statistics can include, e.g., I/O operations per second (IOPS), I/O latency, and so on. Caching module 108 can then calculate a moving average of one or more of the I/O statistics and delay execution of the transaction replay process until the moving average falls below a predetermined threshold. For instance, caching module 108 can delay execution of the transaction replay process until a moving average of IOPs for backend storage device 112 is less than 20% of the maximum IOPS capability of backend storage device 112. In this manner, transaction replay module 122 can avoid replaying transaction entries during the I/O peak time of backend storage devices 112, which reduces the peak I/O capability requirement for backend storage device 112.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for achieving crash consistency when performing write-behind caching using a flash storage-based cache, the method comprising:
   receiving, by a computer system, a write request from a virtual machine (VM) that comprises data to be written to a virtual disk;
   caching, by the computer system, the data in the flash storage-based cache;
   logging, by the computer system, a transaction entry for the write request in the flash storage-based cache, the transaction entry including information usable for flushing the data from the flash storage-based cache to a storage device storing the virtual disk; and
   communicating, by the computer system, an acknowledgment to the VM indicating that the write request has been successfully processed,
   wherein the logging and communicating are performed as a single, atomic operation, such that the VM only receives the acknowledgement if the transaction entry has been successfully logged in the flash storage-based cache.

2. The method of claim 1 wherein the information usable for flushing the data from the flash storage-based cache to the storage device storing the virtual disk comprises a transaction identifier, an offset in the flash storage-based cache where the data is cached, an identifier of the virtual disk, and an offset identifying one or more pages in the virtual disk where the data should be written.

3. The method of claim 2 wherein the caching comprises:
   allocating one or more new pages in the flash storage-based cache; and
   caching the data in the one or more new pages.

4. The method of claim 3 further comprising:
   determining if the flash storage-based cache already includes previously cached data corresponding to the one or more pages of the virtual disk; and
   if the flash storage-based cache already includes the previously cached data, invalidating the previously cached data.

5. The method of claim 4 wherein invalidating the previously cached data comprises:
   deleting one or more transaction entries in the flash storage-based cache that are associated with the previously cached data; and
   de-allocating one or more pages in the flash storage-based cache that store the previously cached data.

6. The method of claim 1 further comprising flushing, based on the transaction entry, the data from the flash storage-based cache to the storage device.

7. The method of claim 6 wherein the flushing is performed upon restarting the computer system after a system crash.

8. The method of claim 6 wherein the flushing is performed prior to powering down the computer system.

9. The method of claim 6 wherein the transaction entry is logged in a first transaction buffer area of the flash storage-based cache, and wherein the data is cached in a first write buffer area of the flash-storage based cache.

10. The method of claim 9 wherein the flushing is performed when the first transaction buffer area reaches a predetermined threshold size.

11. The method of claim 9 wherein the flushing is performed while the computer system receives and processes additional write requests from VMs.

12. The method of claim 11 wherein transaction entries for the additional write requests are logged in one or more second transaction buffer areas in the flash storage-based cache that are distinct from the first transaction buffer area, and wherein data for the additional write requests are cached in one or more second write buffer areas in the flash storage-based cache that are distinct from the first write buffer area.

13. The method of claim 9 further comprising:
   sampling I/O statistics for the storage device; and
   calculating, based on the I/O statistics, a moving average of I/O operations per second (IOPS) for the storage device,
   wherein the flushing is performed when the moving average of IOPS falls below a predefined threshold.

14. The method of claim 1 wherein the caching, the logging, and the communicating are skipped if a size of the data included in the write request is greater than a predefined maximum size or less than a predefined minimum size.

15. The method of claim 14 further comprising:
   if the caching, the logging, and the communicating are skipped, invalidating previously cached data in the flash storage-based cache that overlaps with the data included in the write request.

16. A non-transitory computer readable storage medium having stored thereon computer software executable by a processor, the computer software embodying a method for achieving crash consistency when caching write requests using a flash storage-based cache, the method comprising:

receiving a write request from a VM that comprises data to be written to a virtual disk;

caching the data in the flash storage-based cache;

logging a transaction entry for the write request in the flash storage-based cache, the transaction entry including information usable for flushing the data from the flash storage-based cache to a storage device storing the virtual disk; and communicating an acknowledgment to the VM indicating that the write request has been successfully processed, wherein the logging and the communicating are performed as a single, atomic operation, such that the VM only receives the acknowledgement if the transaction entry has been successfully logged in the flash storage-based cache.

17. The non-transitory computer readable storage medium of claim 16 wherein the information usable for flushing the data from the flash storage-based cache to the storage device storing the virtual disk comprises a transaction identifier, an offset in the flash storage-based cache where the data is cached, an identifier of the virtual disk, and an offset identifying one or more pages in the virtual disk where the data should be written.

18. A system for achieving crash consistency when caching write requests using a flash storage-based cache, the system comprising:

a processor configured to:

receive a write request from a VM that comprises data to be written to a virtual disk;

cache the data in the flash storage-based cache;

log a transaction entry for the write request in the flash storage-based cache, the transaction entry including information usable for flushing the data from the flash storage-based cache to a storage device storing the virtual disk; and communicate an acknowledgment to the VM indicating that the write request has been successfully processed, wherein the logging and the communicating are performed as a single, atomic operation, such that the VM only receives the acknowledgement if the transaction entry has been successfully logged in the flash storage-based cache.

19. The system of claim 18 wherein the information usable for flushing the data from the flash storage-based cache to the storage device storing the virtual disk comprises a transaction identifier, an offset in the flash storage-based cache where the data is cached, an identifier of the virtual disk, and an offset identifying one or more pages in the virtual disk where the data should be written.

\* \* \* \* \*